(12) United States Patent
Barnes et al.

(10) Patent No.: US 8,071,948 B2
(45) Date of Patent: Dec. 6, 2011

(54) AIRCRAFT HAVING AN INTEGRATED RADIATION DETECTION SYSTEM AND METHOD THEREFOR

(75) Inventors: James Gary Barnes, Los Angeles, CA (US); Thomas Robert Austin, Rancho Palos Verdes, CA (US)

(73) Assignee: The Boeing Company, Chicago, IL (US)

( * ) Notice: Subject to any disclaimer, the term of this patent is extended or adjusted under 35 U.S.C. 154(b) by 583 days.

(21) Appl. No.: 12/121,956

(22) Filed: May 16, 2008

(65) Prior Publication Data

US 2009/0283686 A1 Nov. 19, 2009

(51) Int. Cl.
*G01T 1/20* (2006.01)
*G01T 1/00* (2006.01)
*G01N 21/64* (2006.01)

(52) U.S. Cl. .................. 250/361 R; 250/362; 250/483.1
(58) Field of Classification Search .................. None
See application file for complete search history.

(56) References Cited

U.S. PATENT DOCUMENTS

| 3,555,278 | A | 1/1971 | Schroeder |
| 4,464,574 | A | 8/1984 | Vandrish |
| 4,571,492 | A | 2/1986 | Kane et al. |
| 4,808,827 | A | 2/1989 | Woollam |
| 6,184,531 | B1 | 2/2001 | Smart et al. |
| 2006/0266948 | A1 | 11/2006 | Hofstetter et al. |
| 2007/0012879 | A1* | 1/2007 | Testardi ............. 250/361 R |

* cited by examiner

*Primary Examiner* — David Porta
*Assistant Examiner* — Carolyn Igyarto
(74) *Attorney, Agent, or Firm* — Weiss & Moy, P.C.

(57) ABSTRACT

A radiation detection aircraft has at least one component member of the aircraft having scintillator material. A signal converter is coupled to the at least one component member. An accumulator is coupled to the signal converter.

23 Claims, 7 Drawing Sheets

AIRCRAFT HAVING AN INTEGRATED RADIATION DETECTION SYSTEM AND METHOD THEREFOR

BACKGROUND

Embodiments of this disclosure relate generally to a radiation detection system, and more particularly, to an aircraft having components of a radiation detection system integrated into the aircraft structure.

The threat of terrorist groups and rogue nation states using radiological and/or nuclear weapons against the United States has dramatically increased over the past several years. Unfortunately, the design, development, manufacture and storage of these materials and weapons generally occur in locations that are difficult to locate.

Presently radiological and/or nuclear material detection is done either by manned ground teams, manned aircraft and/or UAV aircraft. Manned ground teams have limited use since manned ground teams generally only use hand held detectors which may have very limited range. Furthermore, manned ground teams may be exposed to safety and security related consequences with the potential likelihood of interdiction, capture and/or awareness by the enemy. Because of this, covert and overt mission capabilities are extremely difficult.

Manned and UAV aircraft also have certain limitations. Manned and UAV aircraft generally use solid-state radiological and/or nuclear detectors. Solid-state radiation detectors may generally be characterized with low detector volumes. This is due to the interaction physics within the radiation detector and the statistical likelihood of interaction between the radiation photons to be measured and the volumetric size of radiation detectors.

Furthermore, in manned and UAV aircraft, the detectors are housed in an aerodynamic and structural airframe that is generally mounted externally to the aircraft. As the payload of the manned and especially unmanned air vehicle system is limited, this subsequently limits the radiation detector volume and therefore the sensitivity of the radiation detection system.

Therefore, it would be desirable to provide a system and method that overcomes the above problems.

SUMMARY

An embodiment of a radiation detection aircraft has at least one component member of the aircraft having scintillator material. A signal converter is coupled to the at least one component member. An accumulator is coupled to the signal converter.

A method of detecting radiation comprising: operating an aircraft having structural component members of the aircraft having scintillator material; monitoring light signals generated by the structural component members of the aircraft having scintillator material; and accumulating the light signals to determine radiation level.

Another embodiment of a radiation detection system has at least one component member of an airframe of the aircraft having scintillator material. A signal converter is coupled to the at least one component member to convert signals generated from the scintillator material to pulse signals. An accumulator is coupled to the signal converter to record the pulse signals to determine a radiation level.

The features, functions, and advantages can be achieved independently in various embodiments of the disclosure or may be combined in yet other embodiments.

BRIEF DESCRIPTION OF THE DRAWINGS

Embodiments of the disclosure will become more fully understood from the detailed description and the accompanying drawings, wherein.

DETAILED DESCRIPTION

Figure 1:
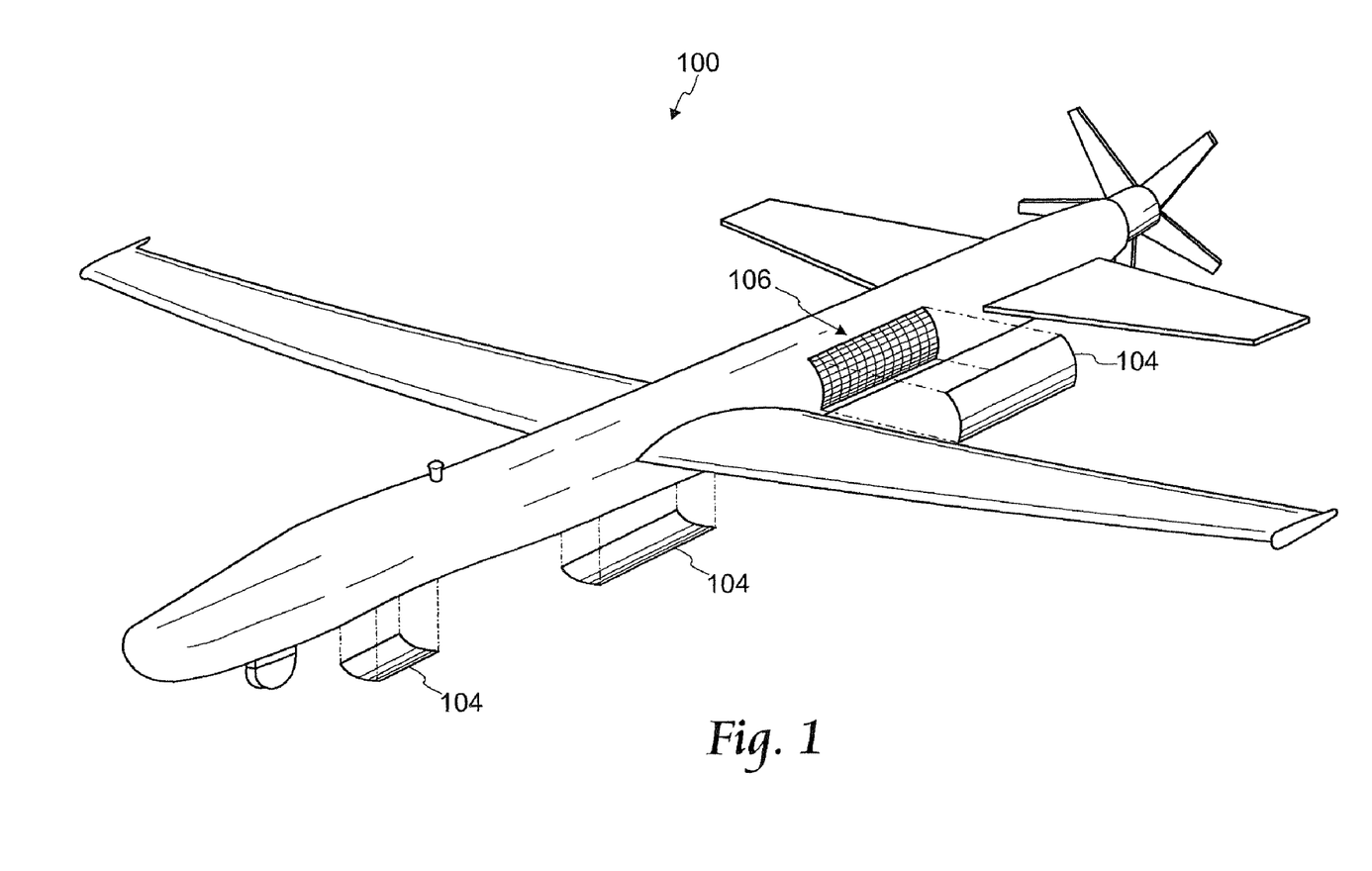
FIG. 1 is one embodiment of an aircraft incorporating an integrated radiation detection system.

With reference now to the Figures, an aircraft 100 having a radiation detection system 102 (FIG. 4D) is shown. FIG. 1 shows one embodiment of the aircraft 100. The aircraft 100 may take on different shapes and sizes without departing from the spirit and scope. The aircraft 100 may be a manned aircraft, a UAV aircraft or the like. The aircraft 100 is shown wherein skin members 104 have been removed from the aircraft 100 to expose portions of the structural airframe 106 of the aircraft 100.

In the aircraft 100, in order to increase the detector volume of the integrated radiation detection system 102, a scintillator material 108 (FIG. 4A) is used to form different component members of the structural airframe 106 of the aircraft 100. The scintillator material 108 may further be used to form different component members of the aircraft skin 104. A scintillator material 108 is a substance that absorbs high energy such as charged particle radiation. In response to absorbing the high energy, fluoresces photons at a characteristic Stokes-shifted wavelength are generated, releasing the previously absorbed energy.

Scintillator materials 108 are defined by their light output (number of emitted photons per unit absorbed energy), short fluorescence decay times, and optical transparency at wavelengths of their own specific emission energy. The lower the decay time of a scintillator material 108, that is, the shorter the duration of its flashes of fluorescence are, the less so-called "dead time" the radiation detection system 102 will have and the more ionizing events per unit of time it will be able to detect.

In accordance with one embodiment, the scintillator material 108 may be a plastic scintillator material, cast resins, organic crystal material or the like. The scintillator material 108 may be used to form different component members of the structural airframe 106 of the aircraft 100. The scintillator material 108 may further be used to form different component members of the aircraft skin 104. The component members formed of the scintillator material 108 can be substituted for or combined with existing component members in the structures of the aircraft 100.

Figure 2:
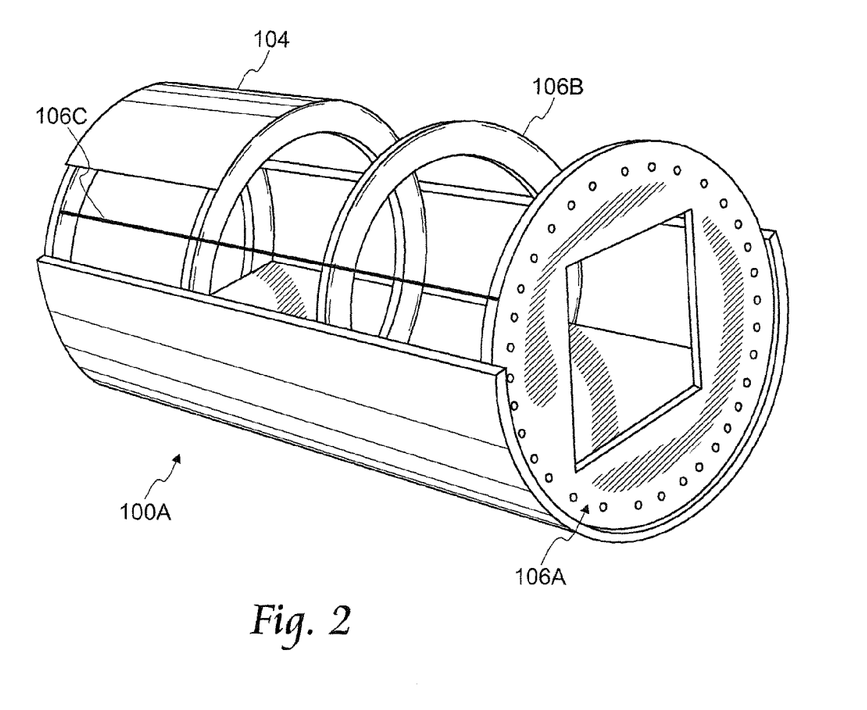
FIG. 2 is a magnified view of the interior structure of the fuselage of the aircraft incorporating an embodiment of the integration detection system.

In FIG. 2, a magnified section of the fuselage 100A of the aircraft 100 is shown. As stated above, different component members of the structural airframe 106 of the aircraft 100 may be formed of scintillator material 108. In the embodiment shown in FIG. 2, the main structural components of the fuselage 100A are shown. The fuselage 100A will generally have a bulkhead 106A and a plurality of support members 106B. Bracing members 106C may be used to secure the bulkhead 106A and the plurality of support members 106B together. The main structural components of the fuselage 100A may then be covered with the aircraft skin 104. In this embodiment having the aircraft skin 104, the bracing members 106C may provide longitudinal support of the aircraft skin 104. In accordance with one embodiment, the bulkhead 106A and a plurality of support members 106B may be formed of scintillator material 108. The one or more sheets of the aircraft skin 104 on the fuselage 100A may also be formed of scintillator material 108. By using scintillation material 108 in different component members of the structural airframe 106 of the fuselage 100A, the detector volume is increased without adding additional weight to the aircraft 100. Instead, the weight of the radiation detection system 102 is integrated into the overall weight of the aircraft 100 and offers a reduction in overall weight of the aircraft 100. This permits a larger volume of radiation detector(s) to be flown with the aircraft 100 that provide a more accurate means of detecting radiation fields.

Figure 3:
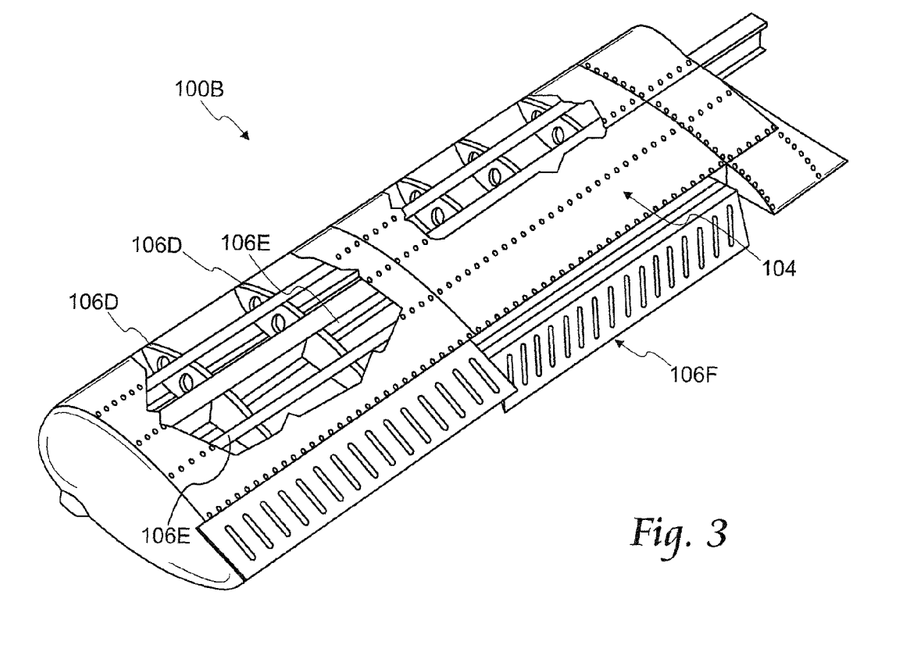
FIG. 3 is a magnified view of the interior structure of the wing assembly of the aircraft incorporating an embodiment of the integration detection system.

In FIG. 3, a magnified section of a wing assembly 100B of the aircraft 100 is shown. As stated above, different component members of the structural airframe 106 of the aircraft 100 may be formed of scintillator material 108. In the embodiment shown in FIG. 3, structural components of the wing assembly 100B are shown. The wing assembly 100B may generally have a plurality of wing rib members 106D which may be connected together by wing spars 106E. Attached to the rear of the wing assembly 100B may be flap members 106F which are generally used to control the movement of the aircraft 100. The main structural components of the wing assembly 100B may be covered with the aircraft skin 104. In accordance with one embodiment, the wing rib members 106D and/or the wing spars 106E may be formed of scintillator material 108. The one or more sheets of the aircraft skin 104 on the wing assembly 100B may also be formed of scintillator material 108. By using scintillation material 108 to form different component members of the wing assembly 100B, the detector volume is increased without adding additional weight to the aircraft 100. Instead, the weight of the radiation detection system 102 is integrated into the overall weight of the aircraft 100 and thus offers a reduction in overall weight of the aircraft 100. This permits a relatively large volume of radiation detector(s) to be flown with the aircraft thereby providing a more accurate means of detecting radiation fields. Furthermore, the radiation detection system 102 increases the radiation detector volume without requiring larger devices to be mounted externally to the aircraft and/or larger aircrafts. Thus, the radiation detection system 102 does not increase the radar signature of the aircraft 100 or require additional manned ground teams thereby allowing more covert means of detecting radiation fields.

Figure 4A:
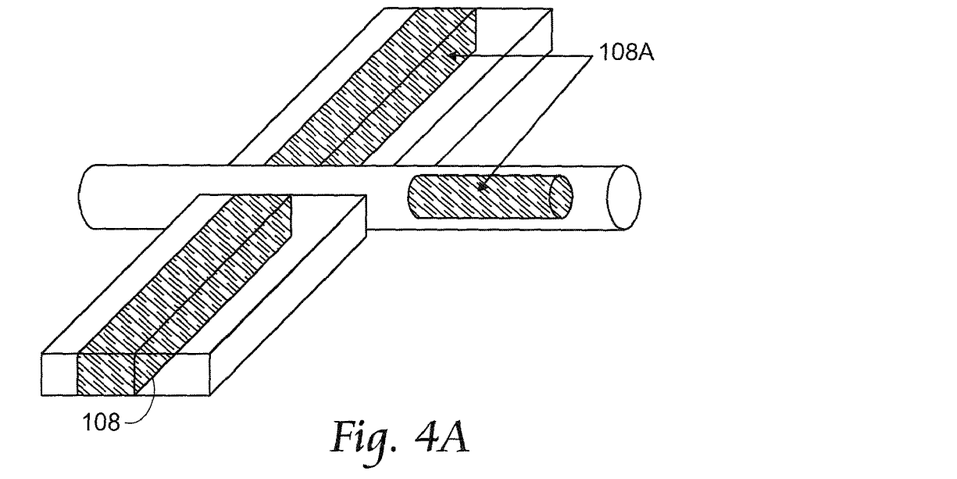
FIG. 4A is a simplified block view of an embodiment of the scintillating structural components used in forming the aircraft.
Figure 4B:
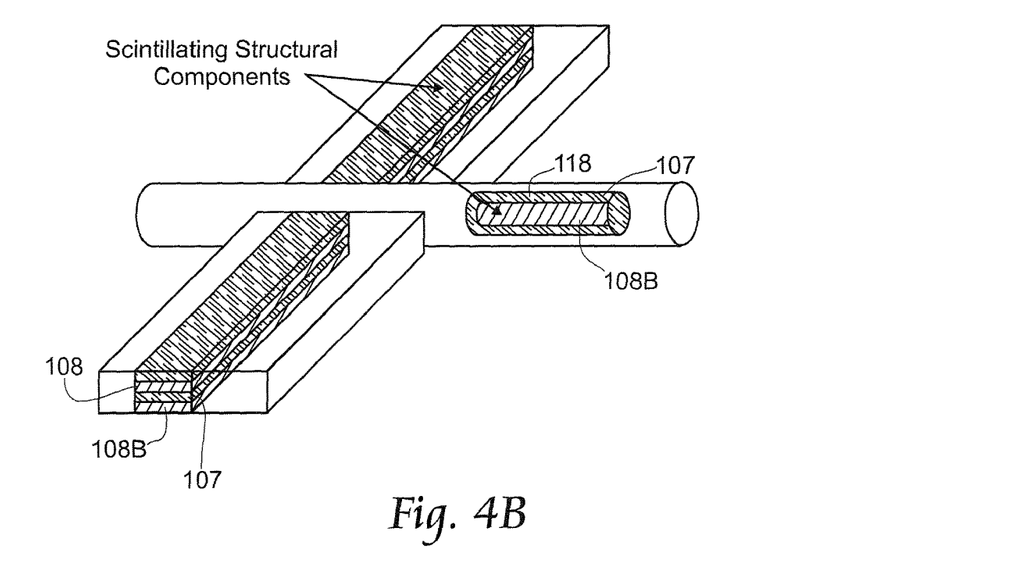
FIG. 4B is a magnified view of an embodiment of the scintillating structural components used in forming the aircraft.

Referring now to FIGS. 4A-4B, more detailed views of the structural airframe 106 having scintillation material 108 are shown. As stated above, different component members of the structural airframe 106 of the aircraft 100 may be formed/comprised of scintillation material 108 to increase the detector volume of the radiation detection system 102. The structural airframe 106 having scintillation material 108 may be formed in different manners. As shown in FIG. 4A, the structural airframe 106 having scintillation material 108 may be composed of solid elements 108A of scintillator material 108. Alternatively, the structural airframe 106 having scintillation material 108 may be composed of multiple thin elements of scintillator material 108B attached and positioned between layers of composite material sheets 107 as shown in FIG. 4B.

Figure 4C:
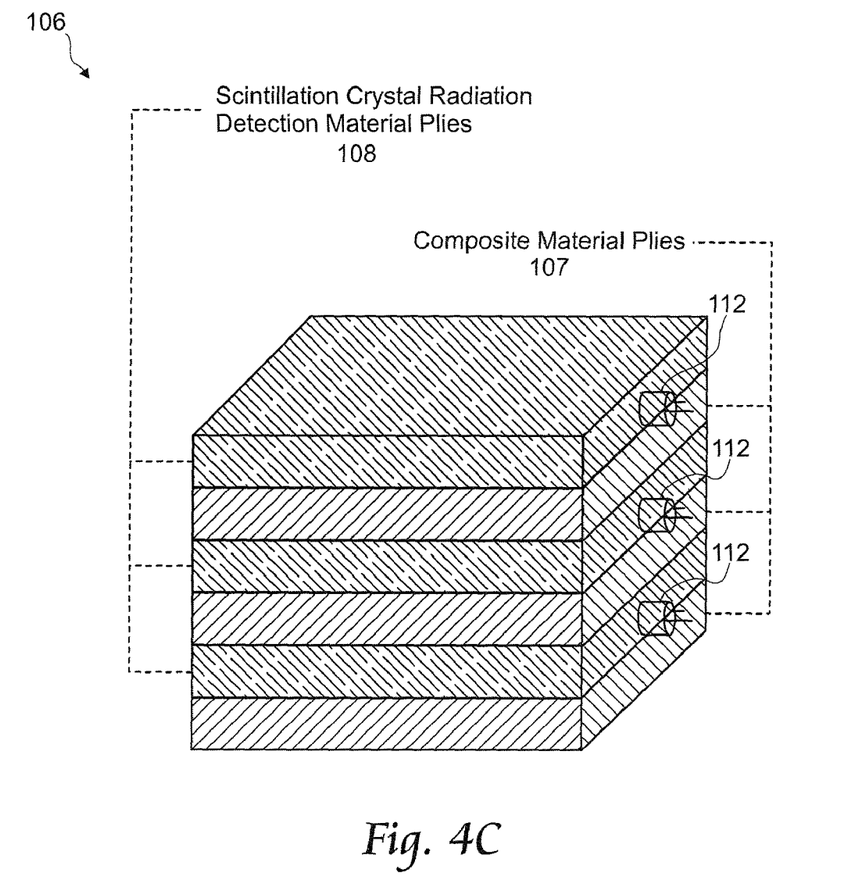
FIG. 4C is a simplified block diagram of an embodiment of the integrated radiation detection system.
Figure 4D:
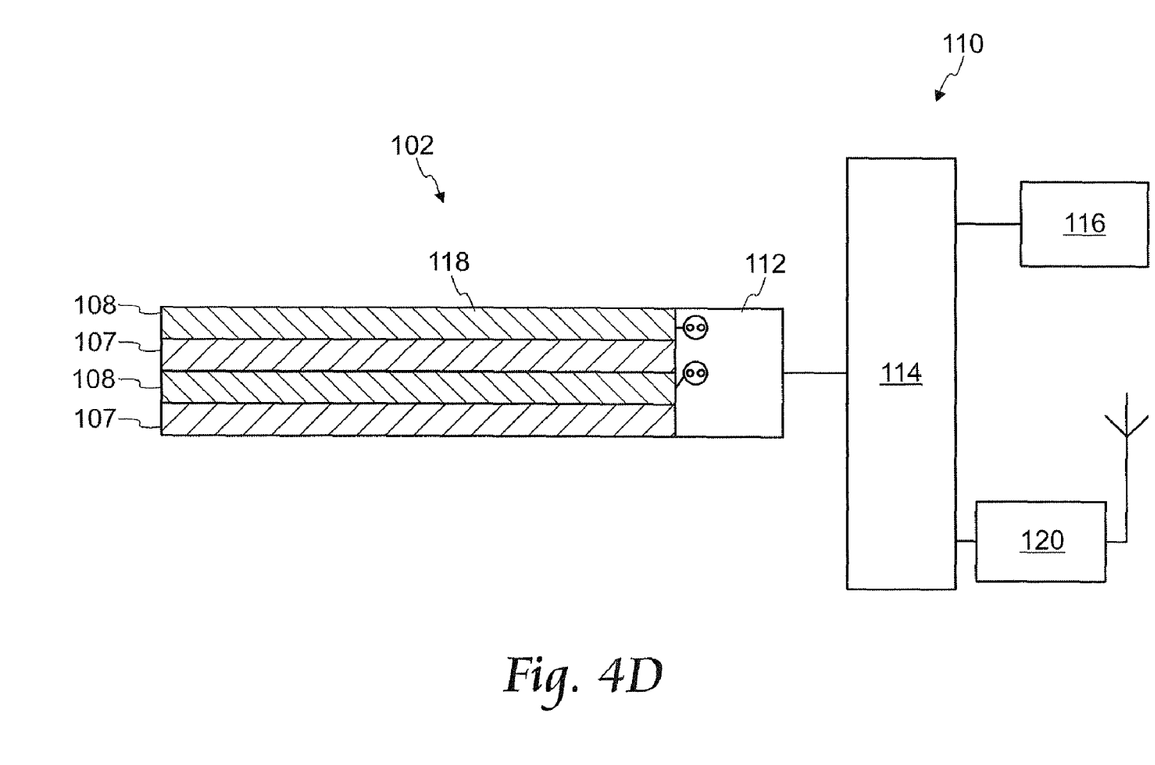
FIG. 4D is a block diagram of an embodiment of the integrated radiation detection system.

Referring now to FIGS. 4C-4D, in order to use the different component members of the structural airframe 106 having scintillation material 108 in the radiation detection system 102, the different component members of the structural airframe 106 having scintillation material 108 are each coupled to a monitoring device 110. FIGS. 4C-4D are directed to the embodiment shown in FIG. 4B but the monitoring device 110 may also be used with the embodiment shown in FIG. 4A as well. The monitoring device 110 records signals from the different component members of the structural airframe 106 having scintillation material 108 and determines a count rate of radiation photons monitored. The monitoring device 110 may further coordinate the location where the count rate was monitored.

In accordance with one embodiment of the present disclosure, the monitoring device 110 may use a signal converter 112. The signal converter 112 may be coupled to each component member of the structural airframe 106 having scintillation material 108. When the component member of the structural airframe 106 having scintillation material 108 absorbs high energy such as charged particle radiation, fluoresces photons at a characteristic Stokes-shifted wavelength may be generated. The signal converter 112 may be used to convert the fluoresces photons generated to pulse signals. The signal converter 112 may be a photomultiplier tube, a light detecting diode, and the like.

In order to more accurately read the fluoresces photons released by each component member having scintillation material 108, the component member having scintillation material 108 may be enclosed with a covering 118. The covering 118 will generally be a non-opaque covering to prevent any ambient light from interfering with the fluoresces photons generated.

The pulse signals generated by each signal converter 112 may be sent to an accumulator 114. The accumulator 114 gathers the output signals from each signal converter 112 and determines a count rate of radiation photons. The accumulator 114 may be coupled to a location system 116 so that the count rate calculated may be coordinated to a specific location. The location system 116 would generally be a mapping system, a Global Positioning Satellite (GPS) system or the like. This information may then be transmitted using a wireless transmitting system 120 in the aircraft 100 to a remote or stand-off sea, land or air-based monitoring station for real-time radiation field mapping, analyses and forensics.

Figure 5:
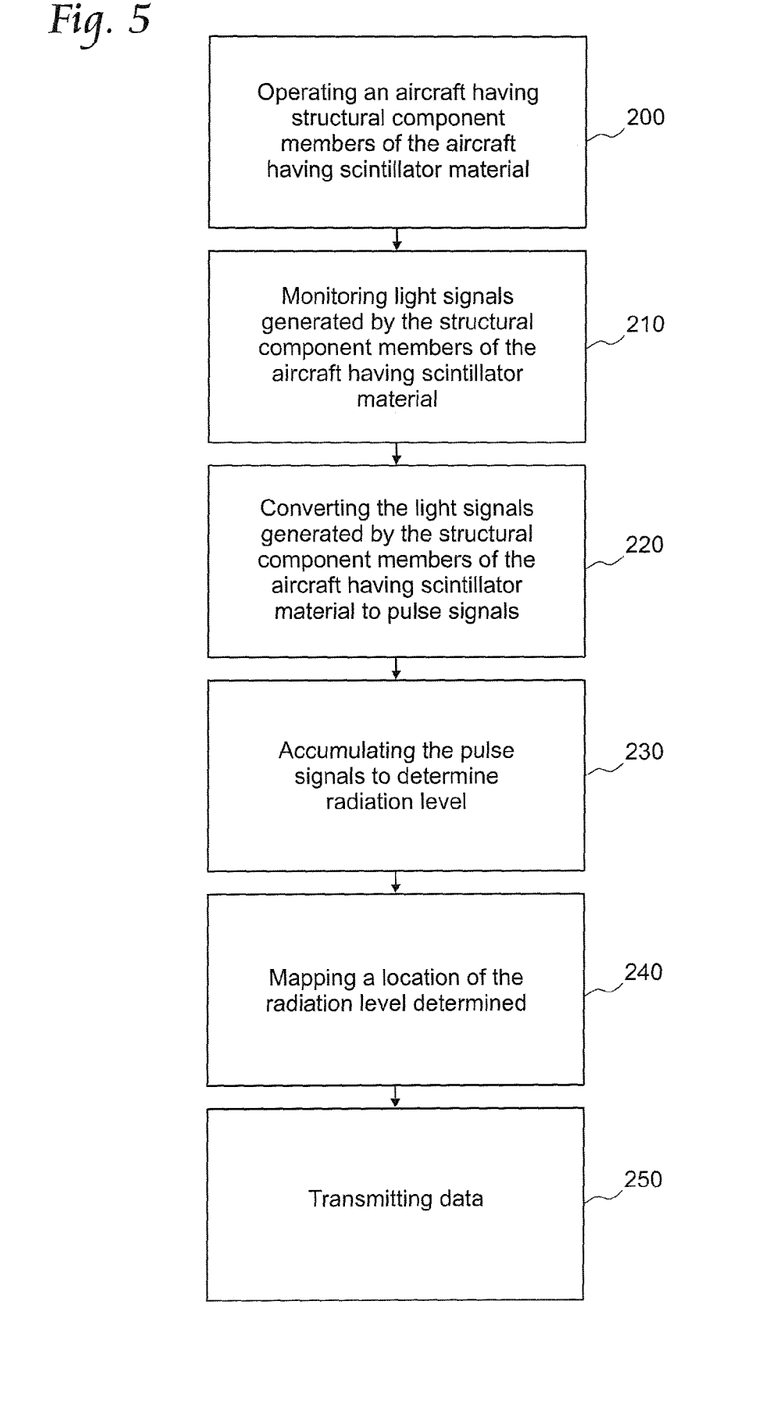
FIG. 5 is a flow chart depicting a method of detecting radiation using an aircraft incorporating an integrated radiation detection system.

Referring to FIG. 5, in operation, in order to increase the detector volume of the integrated radiation detection system 102, a scintillator material 108 may be used to form different component members of the structural airframe 106 of the aircraft 100 as shown in 200. When charged particle radiation is detected by the different component members of the structural airframe 106 having scintillator material 108, the different component members having scintillator material 108 absorb the charged particle radiation and generate fluoresces photons 210. The fluoresces photons may be to convert pulse signals 220. A monitoring device 110 records signals from the different component members having scintillation material 108 and determine a count rate of radiation photons monitored as shown in 230. The monitoring device 110 will further coordinate the location where the count rate was monitored 240. This information may then be transmitted to a remote or stand-off sea, land or air-based monitoring station for real-time radiation field mapping, analyses and forensics 250.

While embodiments of the disclosure have been described in terms of various specific embodiments, those skilled in the art will recognize that the embodiments of the disclosure can be practiced with modifications within the spirit and scope of the claims.

What is claimed is:

1. A radiation detection aircraft comprising:
    a structural component, wherein the structural component comprises alternating layers of composite material (107) used to form one of a structural airframe component member (106) or an aircraft skin member (104) and scintillator material (108);
    said alternating layers include a layer of said composite material between a first and a second layer of said scintillating material;
    a signal converter (112) coupled to the at least one of a structural airframe component member (106) or an aircraft skin member (104) component member (106); and
    an accumulator (114) coupled to the signal converter (112).

2. The radiation detection aircraft in accordance with claim 1 further comprising a location system (116) coupled to the accumulator (114) to correlate a specific location to data recorded by the accumulator (114).

3. The radiation detection aircraft in accordance with claim 1 further comprising a wireless communication device (120) for transmitting data from the accumulator.

4. The radiation detection aircraft in accordance with claim 1 further comprising an enclosure (118) formed around the structural component.

5. The radiation detection aircraft in accordance with claim 4 wherein the enclosure (118) is formed of a non-opaque material.

6. The radiation detection aircraft in accordance with claim 1 wherein the signal converter (112) is a light detecting diode.

7. The radiation detection aircraft in accordance with claim 1 wherein the signal converter (112) is a photomultiplier tube.

8. The radiation detection aircraft in accordance with claim 2 wherein the location system (116) is a GPS locator system.

9. The radiation detection aircraft in accordance with claim 1 wherein said structural component is a wing assembly (100B) of the aircraft (100).

10. A method of detecting radiation comprising:
    providing an aircraft (100) having a structural component comprising alternating layers of composite material (107) used to form at least one of a structural airframe component member (106) or an aircraft skin member (104) of the aircraft (100) and scintillator material (108), wherein said alternating layers include a layer of said composite material between a first and a second layer of said scintillating material;
    operating (200) said aircraft (100);
    monitoring (210) light signals generated by the structural component; and
    accumulating (230) the light signals to determine radiation level.

11. The method of claim 10 further comprising converting (220) the light signals generated by the structural component to pulse signals.

12. The method of claim 11 wherein accumulating the light signals to determine radiation level further comprises accumulating (230) the pulse signals to determine radiation level.

13. The method of claim 10 further comprising mapping (240) a location of the radiation level determined.

14. The method of claim 10 further comprising transmitting (250) data of the radiation level determined.

15. A radiation detection system comprising:
    at least one component member of an airframe (106) of an aircraft (100) wherein the at least one component member comprises alternating layers of composite material (107) used to form the component member of the airframe (106) and scintillator material (108);
    said alternating layers include a layer of said composite material between a first and a second layer of said scintillating material;
    an enclosure (118) formed around the at least one component member of the airframe (106) having scintillator material (108);
    a signal converter (112) coupled to the at least one component member of the airframe (106) to convert signals generated from the scintillator material (108) to pulse signals; and
    an accumulator (114) coupled to the signal converter (112) to record the pulse signals to determine a radiation level.

16. The radiation detection system in accordance with claim 15 further comprising a location system (116) coupled to the accumulator (114) to correlate a specific location to the radiation level determined.

17. The radiation detection system in accordance with claim 15 further comprising a wireless communication device (120) for transmitting data from the accumulator (114).

18. The radiation detection system in accordance with claim 15 wherein the at least one component member (106) comprises a solid structure (108A) of scintillator material (108).

19. The radiation detection system in accordance with claim 15 wherein at least one layer (108B) of scintillator material (108) is attached and positioned between layers (107) of a composite material.

20. A detection system comprising:
    at least one component member (106) of an aircraft (100), wherein the component member (106) comprises alternating layers of composite material (107) used to form the component member (106) and scintillator material 108, wherein the at least one component member (106) is one of a structural airframe component member (106) or an aircraft skin member (104) of the aircraft (100);
    said alternating layers include a layer of said composite material between a first and a second layer of said scintillating material;
    an enclosure (118) formed around the at least one component member (106) having scintillator material (108), the enclosure (118) formed of a non-opaque material;
    a signal converter (112) coupled to the at least one component member (106);
    an accumulator (114) coupled to the signal converter (112);
    a location system (116) coupled to the accumulator (114) to correlate a specific location to data recorded by the accumulator (114); and a
    wireless communication device (120) coupled to the accumulator for transmitting data from the accumulator (114).

21. The detection system in accordance with claim 20 wherein the at least one component member (106) comprises a structural component member of a fuselage (100A) of the aircraft (100).

22. The detection system in accordance with claim 20 wherein the at least one component member (106) comprises a structural component member of a wing assembly (100B) of the aircraft (100).

23. A method of detecting comprising:
providing an aircraft has at least one structural component member (106) comprising alternating layers of composite material (107) used to form the structural component member (106) and scintillator material 108, wherein said alternating layers include a layer of said composite material between a first and a second layer of said scintillating material;
operating (200) said aircraft;
monitoring (210) light signals generated by the at least one structural component member of the aircraft having scintillator material;
converting (220) the light signals generated by the at least one structural component member of the aircraft having scintillator material to pulse signals;
accumulating (230) the pulse signals to determine radiation level; and
transmitting (250) data of the radiation level determined.

* * * * *